United States Patent
Yudkevich et al.

(10) Patent No.: US 11,630,005 B1
(45) Date of Patent: Apr. 18, 2023

(54) MACHINING MONITOR AND A METHOD FOR MONITORING A MACHINING OF AN OBJECT

(71) Applicants: Eli Yudkevich, Kfar Saba (IL); Yakov Manas, Holon (IL)

(72) Inventors: Eli Yudkevich, Kfar Saba (IL); Yakov Manas, Holon (IL)

( * ) Notice: Subject to any disclaimer, the term of this patent is extended or adjusted under 35 U.S.C. 154(b) by 0 days.

(21) Appl. No.: 17/647,978

(22) Filed: Jan. 13, 2022

(51) Int. Cl.
*G01K 13/00* (2021.01)
*G01K 13/08* (2006.01)
*G01K 1/14* (2021.01)
*G01K 1/02* (2021.01)
*G01K 7/01* (2006.01)

(52) U.S. Cl.
CPC ............... *G01K 13/08* (2013.01); *G01K 1/02* (2013.01); *G01K 1/14* (2013.01); *G01K 7/015* (2013.01)

(58) Field of Classification Search
CPC ............ G01K 13/08; G01K 1/02; G01K 1/14; G01K 7/015
See application file for complete search history.

(56) References Cited

U.S. PATENT DOCUMENTS

| | | | | |
|---|---|---|---|---|
| 5,573,335 A | * | 11/1996 | Schinazi | G01K 7/04 73/104 |
| 10,024,737 B2 | * | 7/2018 | Araki | B23K 26/032 |
| 2010/0186975 A1 | * | 7/2010 | Glauning | H02P 1/02 173/217 |
| 2011/0007776 A1 | * | 1/2011 | Yamamoto | G01K 1/08 374/208 |
| 2014/0151581 A1 | * | 6/2014 | Nemirovsky | G01N 21/3581 250/504 R |
| 2014/0269820 A1 | * | 9/2014 | Perrault | G01K 1/14 374/54 |
| 2015/0003496 A1 | * | 1/2015 | Willing | G01K 13/08 374/161 |

FOREIGN PATENT DOCUMENTS

| | | | | |
|---|---|---|---|---|
| CN | 103128599 A | * | 6/2013 | |
| CN | 103878643 A | * | 6/2014 | ............ B23Q 11/00 |
| CN | 203887625 U | * | 10/2014 | |
| CN | 204381833 U | * | 6/2015 | |
| CN | 107442798 A | * | 12/2017 | |
| CN | 207548146 U | * | 6/2018 | |
| CN | 109202532 A | * | 1/2019 | ............ B23C 9/00 |
| CN | 21051896 U | * | 5/2020 | |
| CN | 201510896 A | * | 5/2020 | |
| CN | 111472749 B | * | 10/2022 | ............ E21B 44/00 |
| DE | 3633573 C1 | * | 2/1988 | |
| IN | 202011044010 A | * | 10/2020 | |
| JP | 2000512378 A | * | 9/2000 | |

(Continued)

*Primary Examiner* — Gail Kaplan Verbitsky
(74) *Attorney, Agent, or Firm* — Reches Patents

(57) ABSTRACT

There may be provided a machining monitor that may include (i) a sensing unit that comprises a thermal sensor, (ii) a processor, (iii) a communication unit, and (iv) a housing. The thermal sensor is configured to (a) thermally sense a sensed region related to the machining during a machining, and while being rotated by a mechanical coupling to a rotation of a cutting tool, and (b) generate thermal detection signals. The processor is configured to determine a temperature parameter related of the sensed region based on the thermal detection signals.

19 Claims, 7 Drawing Sheets

(56) References Cited

FOREIGN PATENT DOCUMENTS

| | | | | | |
|---|---|---|---|---|---|
| JP | 2004347349 | A | * | 12/2004 | |
| JP | 3794938 | B2 | * | 7/2006 | ............. B23Q 11/10 |
| JP | 2006231438 | A | * | 9/2006 | |
| JP | 4014261 | B2 | * | 11/2007 | |
| JP | 3170029 | U | * | 11/2009 | |
| JP | 2015020254 | A | * | 2/2015 | |
| JP | 6025171 | B2 | * | 11/2016 | |
| JP | 2017520414 | A | * | 7/2017 | |
| KR | 2310851 | B1 | * | 10/2021 | |
| WO | WO-2020215475 | A1 | * | 10/2020 | ............. G01D 21/02 |

* cited by examiner

MACHINING MONITOR AND A METHOD FOR MONITORING A MACHINING OF AN OBJECT

BACKGROUND OF THE INVENTION

Objects or various types can be machined—for example be milled of have material removed in other manners. The machining process is aimed to form predefined shapes but may damage the machining object unless supervised.

Machining composite materials and especially military grade composite materials may cause the composite materials to overheat and be damaged. Various composite materials cannot be repaired—and the cost of an overheating error are very high.

It has been found that the durability of machining elements such as drill bits may change from batch to another. The durability of machining elements is hard to evaluate and thus a manufacturer usually may either use machining elements for a fraction of their durability time window or damage machined elements.

The variance in the durability of machining elements may also increase the uncertainty in the thermal behavior of a machined object.

There is a growing need to provide an effective machining monitor and a method for monitoring the machining of an object.

SUMMARY

There may be provided a machining monitor that may include (a) a sensing unit that may include a thermal sensor; (b) a processor; (c) a communication unit; and (d) a housing.

The thermal sensor may be configured to (a) thermally sense a sensed region related to the machining during a machining, and while being rotated by a mechanical coupling to a rotation of a cutting tool, and (b) generate thermal detection signal.

The processor may be configured to determine a temperature parameter related of the sensed region based on the thermal detection signals.

The temperature parameter may be a temperature of the sensed region.

The sensed region may be a sensed region of the object.

The sensed region may be a sensed region of the cutting tool.

The processor may be further configured to determine that the sensed region reaches a first predefined temperature, and generate a first pre-overheating alert.

The communication unit may be configured to communicate the first pre-overheating alert to a computerized unit outside the machining monitor.

The machining monitor may include a man machine interface that may be configured to generate a human perceivable first pre-overheating alert.

The man machine interface may be a light source.

The processor may be further configured to determine that the sensed region reaches a second predefined temperature that exceeds the first predefined temperature and may be lower that an overheat temperature of a drill related region of the object.

The processor may be configured to send a command for stopping the machining following a determination that the sensed region reaches the second predefined temperature.

The processor may be further configured to generate a second pre-overheating alert following a determination that the sensed region reaches the second predefined temperature.

The thermal sensor may be mechanically coupled to the housing and wherein the mechanical adaptor may be configured to mechanically couple the housing to a drill chuck that may be mechanically coupled to the cutting tool during the machining of the object.

The mechanical adaptor may be configured to detachably mechanically couple the housing to the drill chuck.

The thermal sensor may be mechanically coupled to the housing and wherein the housing may be ring shaped.

The housing comprises a thermally conductive window, and wherein the thermal sensor may be configured to sense through.

The machining monitor may include at least one additional sensor that differs from the thermal sensor and may be configured to sense at least one milling parameter.

The at least one milling parameter may be selected out of torque, load and vibrations.

There may be provided a method for monitoring a machining of an object, the method may include: thermally sensing a sensed region related to the machining, wherein the sensing may be executed (a) during the machining, (b) by a thermal sensor of a machining monitor, and (c) while the thermal sensor may be rotated by a mechanical coupling to a rotation of a cutting tool; generating by the thermal sensor thermal detection signals indicative of the sensing; and determining, by a processor of the machining monitor, a temperature parameter related of the sensed region based on the thermal detection signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
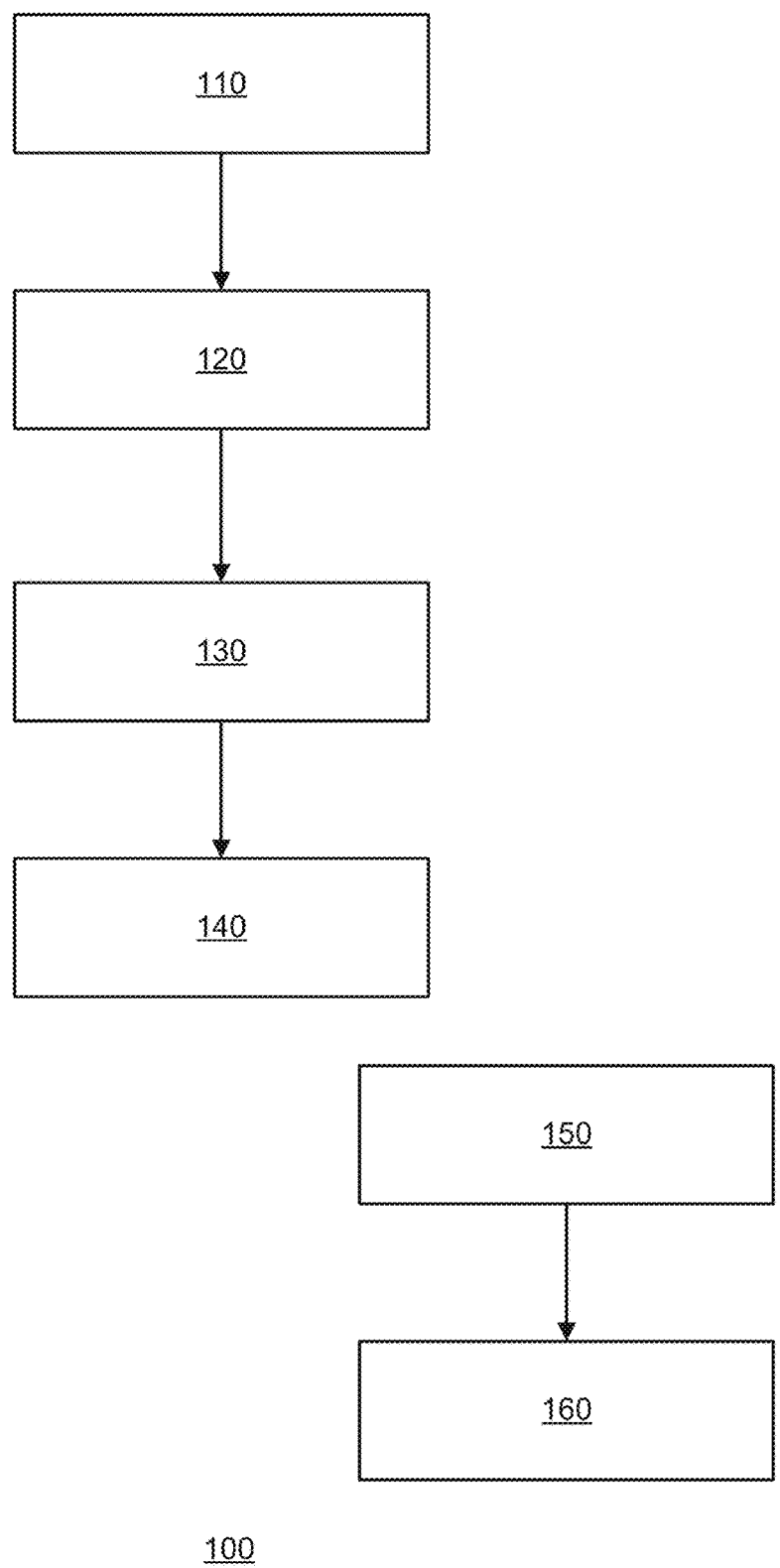
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

The term "cutting tool" is a tool used to machine an object—for example to remove material. The machining may be by cutting or drilling or by any other manner. A drill bit is a non-limiting example of a cutting tool.

Any reference to machining should be applied mutatis mutandis to removal of material by drilling or by a machining process that differs from drilling—for example cutting, and the like.

The term "sensed region" is a region that includes one or more points that have their temperature sensed.

The term "sensed region related to the machining" is a region that has its temperature sensed and can be (a) the drilled region, (b) a region in proximity to a hole, cavity or recess formed by the machining, (c) a region from which the machining removes material, (d) the removed material, and the like.

The term "mechanically coupled" may mean in mechanical communication and/or that there is a mechanical linkage. A mechanically coupling may be obtained by direct contact between mechanically coupled element or without direct contact between mechanically coupled elements. For example—element A may be mechanically coupled to element B when a movement of element B affects the movement of element A. The affecting may include dictating the movement or not dictating the movement.

The suggested method and system may be applicable when machining objects of various materials—but may be highly beneficial when milling composite materials and/or materials that exhibit a thermal behavior that may be unexpected or unknown.

FIG. 1 illustrates method 100 for monitoring a machining of an object.

Method 100 may start by initialization step 110.

Step 110 may include mechanically coupling a thermal sensor of the machining monitor to a driller.

Step 110 may include using a mechanical adaptor mechanically couple a housing of the machining monitor to a drill chuck (or other rotating part of the driller) that is mechanically coupled to a cutting tool. The coupling may be made in a detachable manner—the mechanical adaptor may be configured to detachably mechanically couple the housing to the drill chuck.

The thermal sensor may move (for example rotate) in relation to the housing or may follow the rotational movements of the housing.

The housing may be ring shaped or may have any other shape.

The housing may be compact for example may have an external diameter of that does not exceed 5 centimeters—for example have an external diameter that may range between 12 and 32 millimeter, or range between 10 and 50 millimeter, and have a height that may range between 5-20 millimeters. The internal diameter of the housing may depend on the cutting tool.

The thermal sensor may be compact and may have a field of view that may range between 1 and 80 degrees—for example may range between 20 to 60 degrees. The thermal sensor may have millimetric dimensions such as 3.2 by 4,2 by 1.455 millimeters.

The thermal sensor may be, for example, a nano-machined CMOS transistor such as the TMOS™ of Todos Technologies of Haifa, Israel—or the STHS34PF80 sensor of STMicroelectronics Ltd. of Plan-les-Ouates, France.

Initialization step 110 may be followed by step 120 of thermally sensing a sensed region related to the machining and generating by the thermal sensor thermal detection signals indicative of the sensing.

The sensing is executed (a) during the machining, (b) by a thermal sensor of a machining monitor, and (c) while the thermal sensor is rotated by a mechanical coupling to a rotation of a cutting tool.

The sensing can be made through a thermally conductive window, and wherein the thermal sensor is configured to sense through the thermally conductive window.

The drilled object may be formed from one or more materials such as one or more composite materials—for example carbon fiber reinforced plastic—but can be made of non-composite materials.

Step 120 may be followed by step 130 of determining, by a processor of the machining monitor, a temperature parameter related of the sensed region based on the thermal detection signals.

The sensed region may be a sensed region of the object and/or a sensed region of the machining element—such as but not limiting to a cutting tool—for example a drilling bit.

When the sensed region is of the machining bit then the temperature of the drilled object may be determined based on a mapping and/or rule and/or machine learning process that maps sensed region temperature parameters to drilled region temperature parameters. As a rule of thumb is may assumed that the temperature of the cutting tool (at least the tip of the cutting tool) substantially equals the temperature of the drilled region. Other mappings may be provided and may be based on simulations and/or measurements. Substantially equals—till a predefined deviation from—for example till 1, 5, 10 percent, and the like.

The processing may include at least one out of filtering, averaging, associating temperature reading with different points of the sensed region—the associating may be based on the time of sensing and the rotational speed of the cutting tool.

The temperature parameter may be a temperature of the sensed region, a temperature trend (difference) rate, multiple temperatures of multiple points of the sensed region, and the like.

Step 130 may be followed by step 140 of responding to the determining.

The monitoring may be aimed to prevent damage to the drilled object—for example damage due to overheating of the drilled object. There may be provided one or more predefined temperatures that should be equal to or lower than the overheating temperature of the drilled object—that should not be reached.

For example—there may be defined one or more predefined temperatures that once reaches should trigger one or more responses of step 140.

The responses may include at least one out of:
a. Generating an alert to a computerized unit (the computerized unit may or may not belong to the machining monitor).
b. Alerting a human (by generating at least one human perceivable alert) by the machining monitor.
c. Requesting a another unit to generate a human perceivable alert.
d. Sending a request to the computerized unit to change a parameter of the machining (for example reduce at least one out of rotational speed, friction, torque, mechanical load and the like).
e. Sending a request to stop the machining.
f. Sending a request to apply a cooling mechanism for colling the cutting tool and/or the drilled region (for example—by using cooling gas or liquid).
g. Sending a command to the computerized unit to change a parameter of the machining (for example reduce at least one out of rotational speed, friction, torque, mechanical load and the like).
h. Sending a command to stop the machining, sending a request to apply a cooling mechanism for colling the cutting tool and/or the drilled region (for example—by using cooling gas or liquid).
i. Sending a command to apply a cooling mechanism for colling the cutting tool and/or the drilled region (for example—by using cooling gas or liquid).
j. Generating thermal behavior of the drilled region—for example change of temperature over time. Processing the thermal behavior to update or request an update of the temperatures that will trigger the response.

For example—step 140 may include at least one of the following:
a. Determining that the sensed region reaches a first predefined temperature, and generating a first pre-overheating alert.
b. Communicating, by a communication unit of the machining monitor, the first pre-overheating alert to a computerized unit outside the machining monitor.
c. Generating, by a man machine interface of the of the machining monitor, a human perceivable first pre-overheating alert. The man machine interface may be a light source such as a light emitting diode or any other light emitting element.
d. Determining that the sensed region reaches a second predefined temperature that exceeds the first predefined temperature and is lower that an overheat temperature of a drill related region of the object.
e. Sending a command for stopping the machining following a determination that the sensed region reaches the second predefined temperature.
f. Generating a second pre-overheating alert following a determination that the sensed region reaches the second predefined temperature.

The machining monitor may include at least one additional sensor that differs from the thermal sensor and is configured to sense at least one milling parameter. The at least one milling parameter may be torque and/or load and/or vibrations.

Method 100 may also include step 150 of sensing the at least one milling parameter.

Step 150 may be followed by step 160 of responding to the sensing of step 150. Step 160 may also include responding to the outcome of step 120 and step 120.

The responding of step 140 and/or 160 may include sensing that the cutting tool is defective (and maybe should be replaced).

Method 100 may include (in step 140 and/or step 160) of applying machine learnings processes or non-machine learning classifiers may be to determine when thermal behavior of the sensed region and/and mechanical sensed milling parameters (for example mechanical behavior over time) is indicative of a defective cutting tool. The response to such determination may include any type of response listed in step 140—generating an alert, sending a request, sending a command, and the like.

Figure 2:
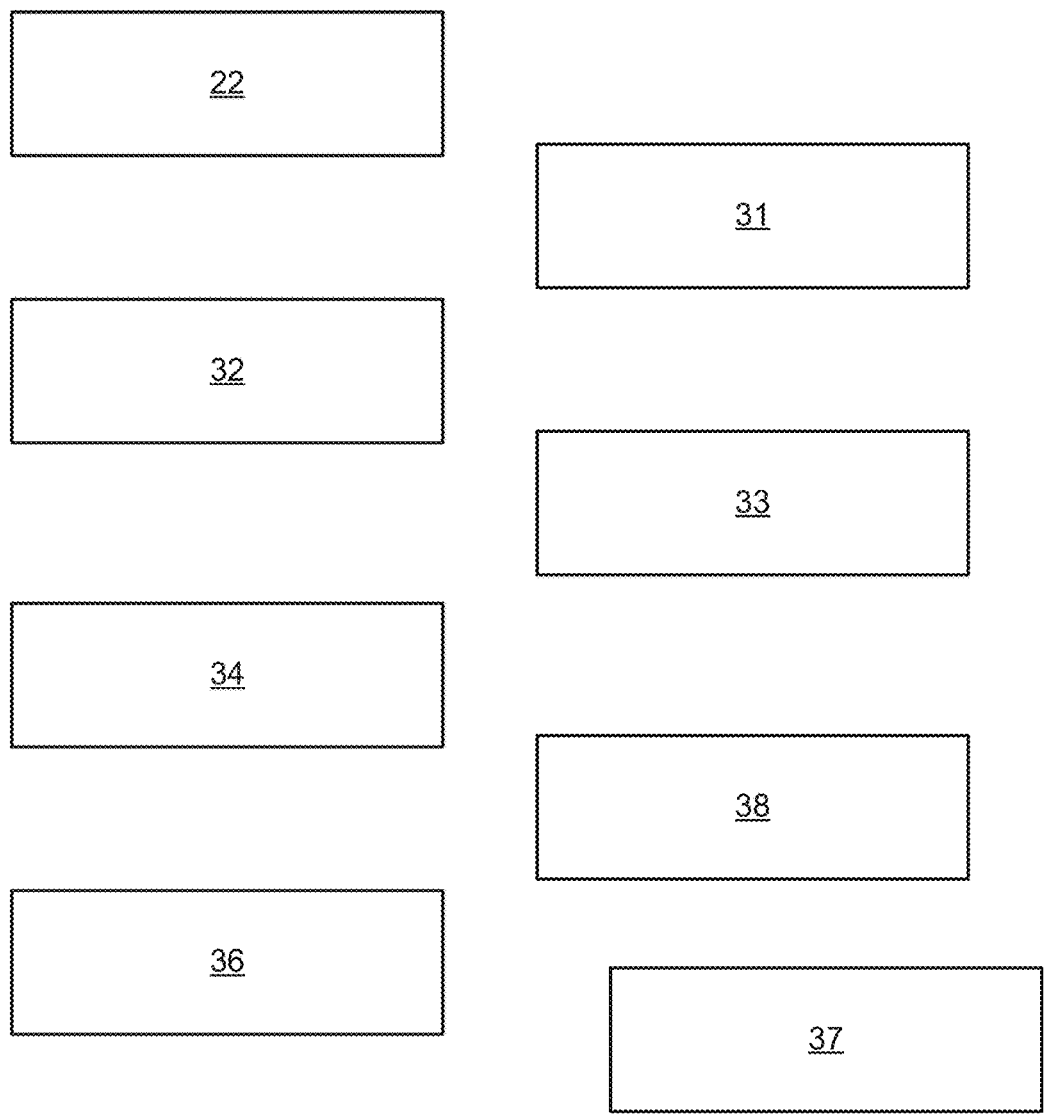
FIGS. 2-7 illustrate examples of machining monitors and their environments.
Figure 3:
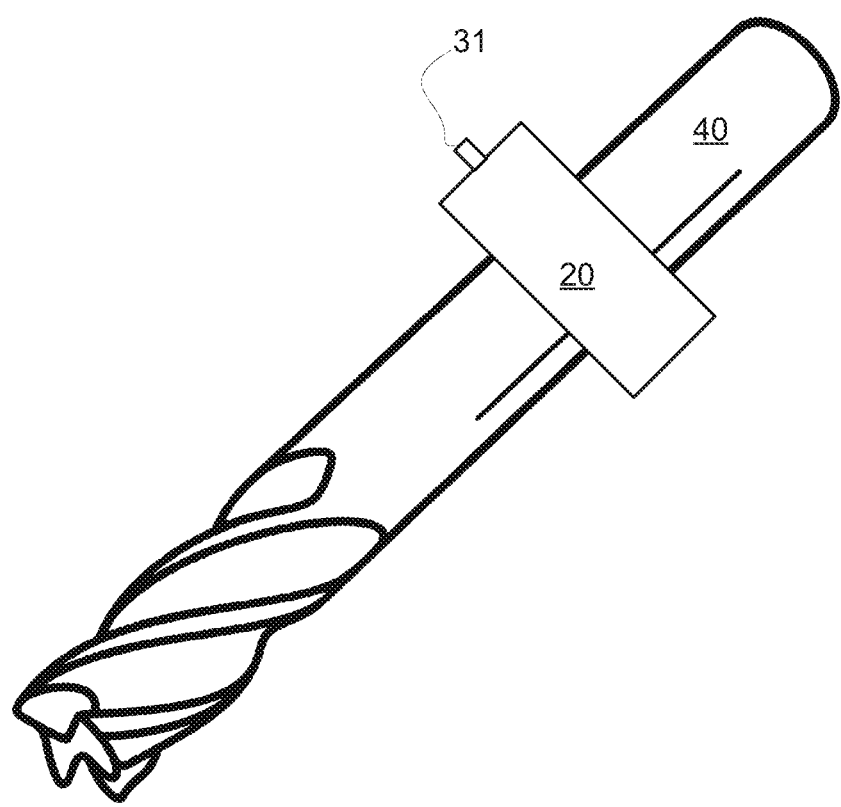
Figure 4:
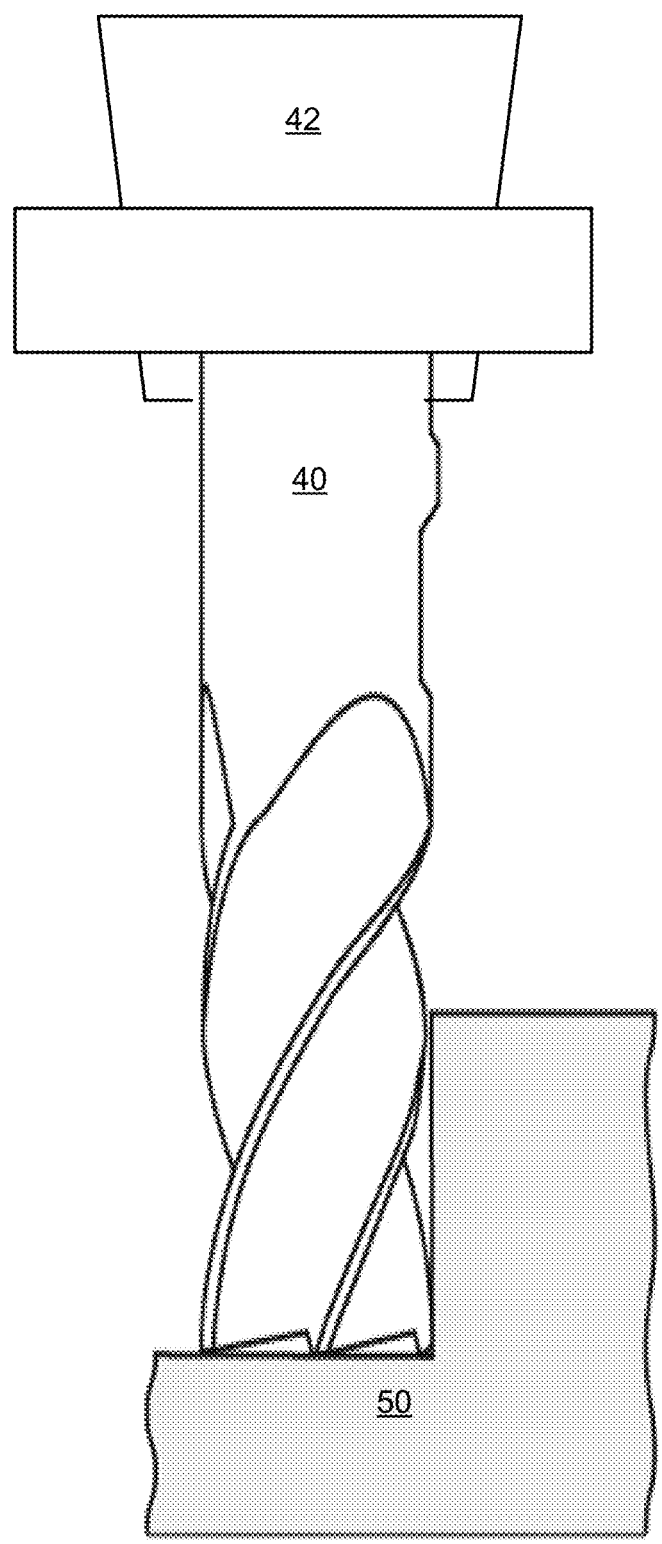

FIG. 2 illustrates an example of a machining monitor 10 for monitoring a machining of an object and its environment.

Machining monitor 10 may include a sensing unit 20 that may include thermal sensor 22, a processor 32, a communication unit 34, and a housing 36.

FIG. 2 also illustrate the machining monitor 10 as including a mechanical adaptor 38, a man machine interface 31, additional sensor 37, and power supply 33 (such as a battery of a wireless charger or a motion to power converter that is electrically coupled to a battery or capacitor—whereas at least the rotation may power the machining monitor). The man machine interface may be omitted. The mechanical adaptor may belong to the driller and/or the machining monitor may be shaped and/or sizes to be held by the mechanical adaptor 38.

The mechanical adaptor 38 may be configured to mechanically couple at least the thermal sensor to a rotation of a cutting tool during a machining of an object.

The thermal sensor may be configured to thermally sense at a sensed region related to the machining, and while being rotated by a mechanical coupling to a rotation of a cutting tool. The thermal sensor may be also configured to generate thermal detection signals indicative of the sensing.

Thermal sensor may be configured to execute step 120.

The processor 32 may be configured to determine a temperature parameter related of the sensed region based on the thermal detection signals. The processor may be configured to execute 130.

At least one of the processor 32, the communication unit 34, and the man machine interface 31 (is such exists) of the machining monitor may be configured to execute at least one of the responses of step 140.

Figure 5:
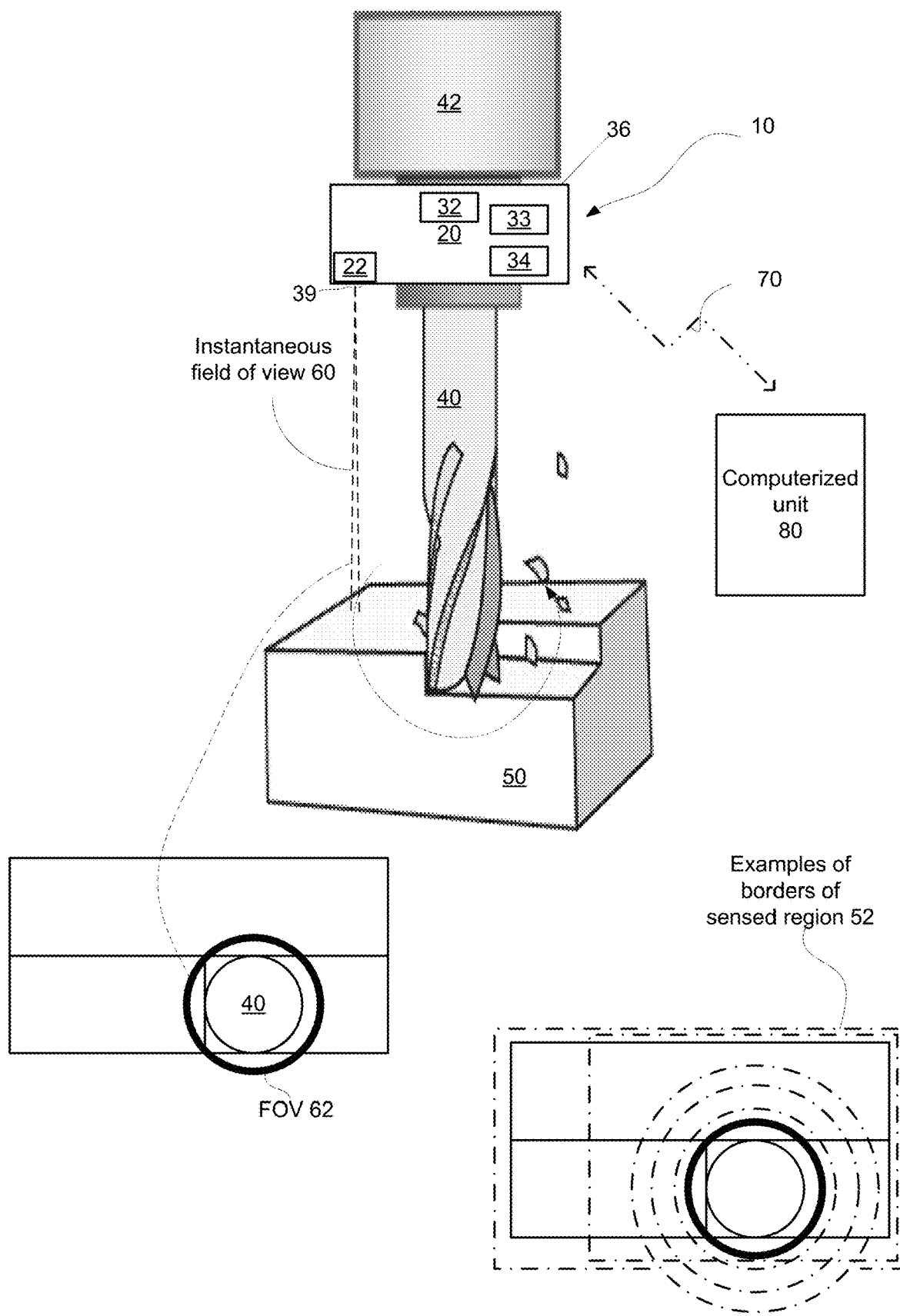
Figure 6:
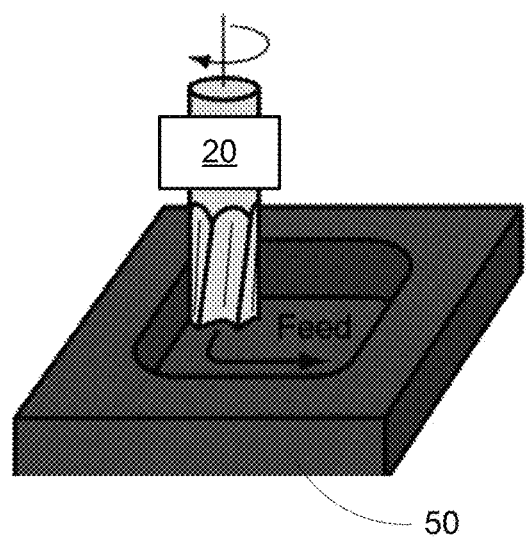
Figure 6:
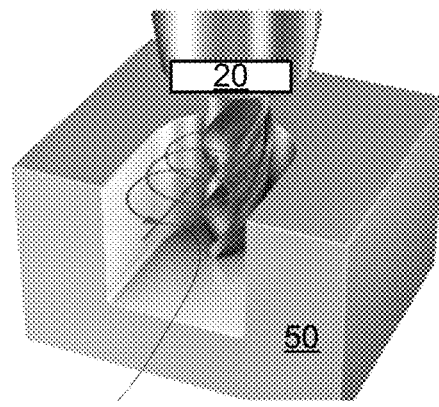
Figure 6:
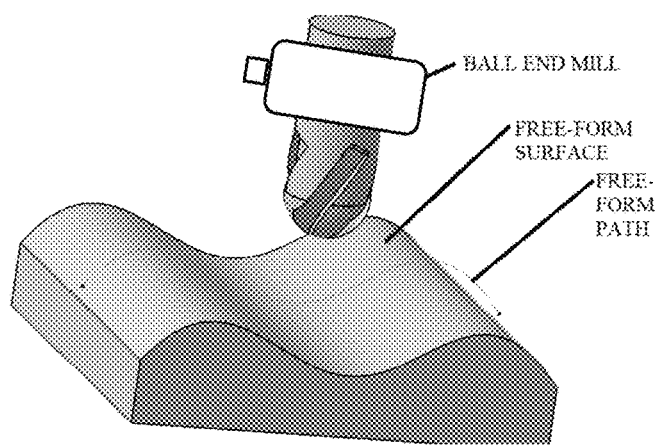
Figure 7:
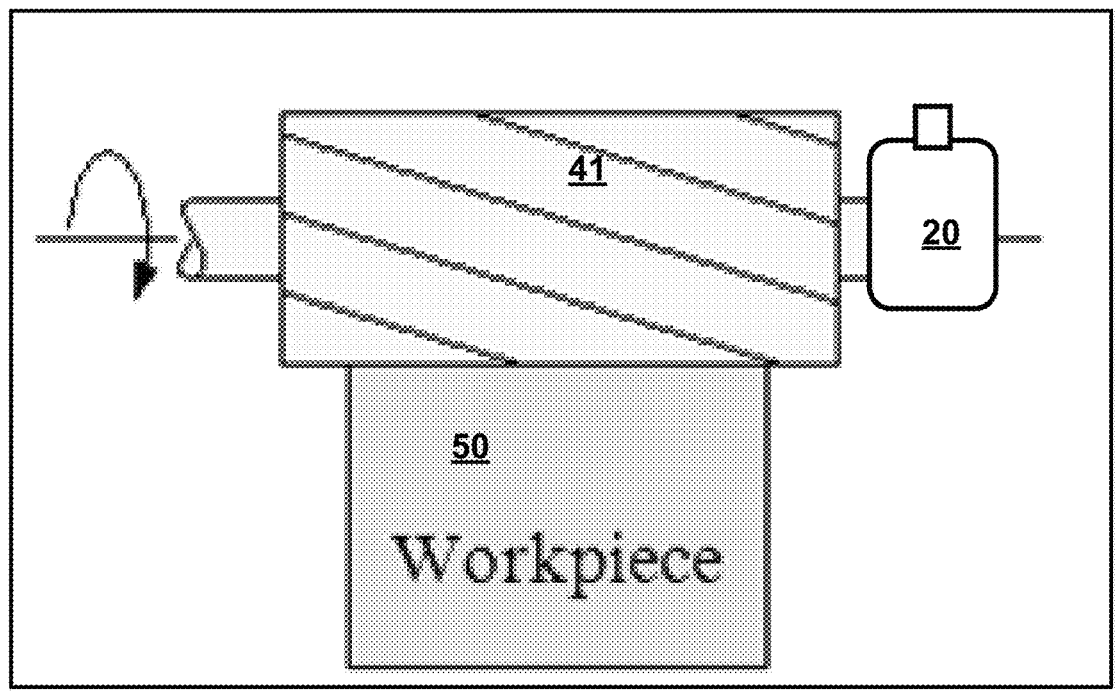
Figure 7:
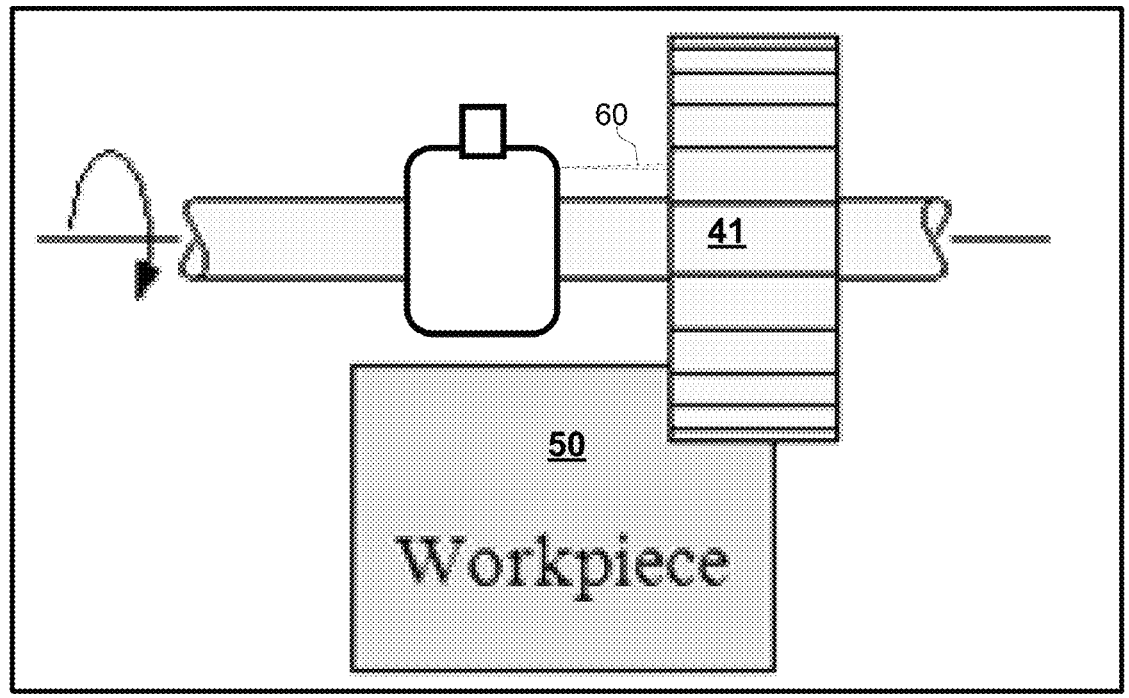

FIGS. 3-6 illustrate examples of machining monitors and their environments. For example, FIG. 5 illustrates the machining monitor 10 as including housing 20 (that include thermally conductive window 39), thermal sensor 22, power supply 33, processor 32, and communication unit.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A machining monitor, comprising:
   a sensing unit, wherein the sensing unit comprises a thermal sensor, a processor, a communication unit and a housing;
   wherein the thermal sensor is configured to (a) perform a contactless thermal sensing of a sensed region of an object during a machining of the object, and while being rotated by a mechanical coupling to a rotation of a cutting tool, and (b) generate thermal detection signals; wherein the thermal sensor is mechanically coupled to the housing and wherein the housing is mechanically coupled to a drill chuck that is mechanically coupled to the cutting tool during the machining of the object; and
   wherein the processor is configured to determine a temperature parameter related of the sensed region based on the thermal detection signals.

2. The machining monitor according to claim 1 wherein the thermal sensor, while being rotated, has a thermal sensor field of view that is spaced apart from the cutting tool and surrounds the cutting tool.

3. The machining monitor according to claim 1 wherein the thermal sensor is a nano-machined CMOS transistor.

4. The machining monitor according to claim 1 wherein the processor is further configured to determine that the temperature of the sensed region reaches a first predefined temperature, and generate a first pre-overheating alert.

5. The machining monitor according to claim 1 wherein the communication unit is configured to communicate the first pre-overheating alert to a computerized unit outside the machining monitor.

6. The machining monitor according to claim 1 comprising a man machine interface; and wherein the man machine interface is configured to generate a human perceivable first pre-overheating alert.

7. The machining monitor according to claim 6 wherein the man machine interface is a light source that is rotated by the mechanical coupling to the rotation of a cutting tool.

8. The machining monitor according to claim 1 wherein the processor is further configured to (i) determine that the temperature of the sensed region reaches a first predefined temperature, (ii) generate a first pre-overheating alert, and (iii) following the determining that the temperature of the sensed region reached the first predefined temperature, determine that the sensed region reaches a second predefined temperature that exceeds the first predefined temperature and is lower that an overheat temperature of a drill related region of the object.

9. The machining monitor according to claim 8 wherein the processor is configured to send a command for stopping the machining following a determination that the sensed region reaches the second predefined temperature.

10. The machining monitor according to claim 8 wherein the processor is further configured to generate a second pre-overheating alert following a determination that the sensed region reaches the second predefined temperature.

11. The machining monitor according to claim 1 wherein the housing is detachably mechanically coupled to the drill chuck.

12. The machining monitor according to claim 1 wherein the thermal sensor is mechanically coupled to the housing and wherein the housing is ring shaped.

13. The machining monitor according to claim 1 wherein the housing comprises a thermally conductive window, and wherein the thermal sensor is configured to sense through the window.

14. The machining monitor according to claim 1 further comprising at least one additional sensor that differs from the thermal sensor and is configured to sense at least one milling parameter.

15. The machining monitor according to claim 12 wherein the at least one milling parameter is selected out of torque, load and vibrations.

16. A machining monitor, comprising:
a sensing unit, wherein the sensing unit comprises a thermal sensor, a processor, a communication unit and a housing;
wherein the thermal sensor is configured to (a) perform a contactless thermal sensing of a sensed region of an object during a machining of the object, and while being rotated by a mechanical coupling to a rotation of a cutting tool, and (b) generate thermal detection signals;
wherein the processor is configured to determine a temperature parameter related of the sensed region based on the thermal detection signals; and
wherein the thermal sensor, while being rotated, has an annular thermal sensor field of view that ranges between twenty and eighty degrees.

17. A method for monitoring a machining of an object, the method comprises:
performing a contactless thermal sensing of a sensed region of the object, wherein the sensing is executed (a) during the machining of the object, (b) by a thermal sensor of a sensing unit of a machining monitor, and (c) while the thermal sensor is rotated by a mechanical coupling to a rotation of a cutting tool; wherein the thermal sensor, while being rotated, has a thermal sensor field of view that is spaced apart from the cutting tool and surrounds the cutting tool; wherein the thermal sensor is mechanically coupled to a housing of the sensing unit; and wherein the housing is mechanically coupled to a drill chuck that is mechanically coupled to the cutting tool during the machining of the object;
generating by the thermal sensor thermal detection signals indicative of the sensing; and
determining, by a processor of the machining monitor, a temperature parameter related of the sensed region based on the thermal detection signals.

18. The method according to claim 17 wherein the sensing occurs during the machining of a composite material.

19. The method according to claim 17 wherein the sensing occurs during the machining of carbon fiber reinforced plastic.

* * * * *